Jan. 28, 1969  A. BRODY  3,424,636
METHOD OF MAKING POCKET-FORMING DEVICE FOR LIBRARY CARDS
Original Filed March 31, 1965  Sheet 1 of 2
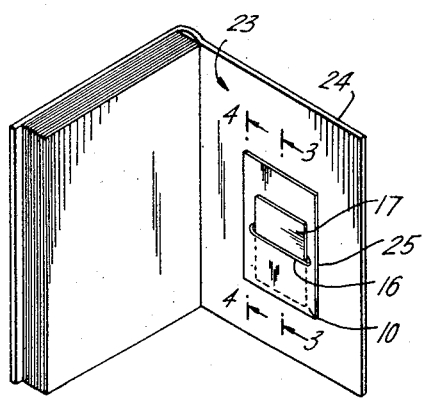
FIG. 1
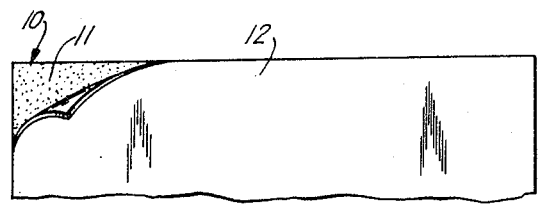
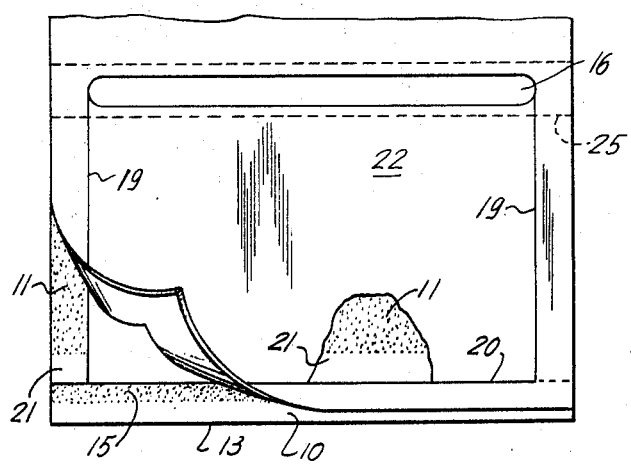
FIG. 2   FIG. 3   FIG. 4
INVENTOR:
ARTHUR BRODY
BY
Breitenfeld & Levine
ATTORNEYS INVENTOR:
ARTHUR BRODY
BY
Breitenfeld & Levine
ATTORNEYS

3,424,636
METHOD OF MAKING POCKET-FORMING DEVICE FOR LIBRARY CARDS
Arthur Brody, 465 Melrose Place,
South Orange, N.J. 07079
Original application Mar. 31, 1965, Ser. No. 444,201, now Patent No. 3,372,858, dated Mar. 12, 1968. Divided and this application Dec. 18, 1967, Ser. No. 691,264
U.S. Cl. 156—201      4 Claims
Int. Cl. B42d *3/18;* B42b *7/00*

---

ABSTRACT OF THE DISCLOSURE

Two continuous strips with pressure sensitive adhesive between them are advanced to a bonding station. One strip is of release material. Both strips cut through to form longitudinal opening. Only release material cut through along periphery of area adjacent to the opening, so that release material covers adhesive in this area even if balance of release material is removed. Both strips cut in regions between those treated as above to form individual pocket-forming devices.

---

This application is a division of my copending application Ser. No. 444,201, filed Mar. 31, 1965, now U.S. Patent No. 3,372,858, issued Mar. 12, 1968.

This invention relates generally to library books and procedures, and has particular reference to the pockets that are applied to library books, usually on the inside of one of the covers, for accommodating library cards.

The type of pocket heretofore commonly employed is a paper or paperboard structure having a rear wall, a front wall of shorter length, and lateral flaps or equivalent means of holding the walls together to define a pocket between them. Its securement to a book involves the application to its rear face, by the user, of suitable adhesive. It is an inefficient and time-consuming operation. The structure of the pocket requires the use of oddly configured stock which is wasteful and correspondingly costly. Moreover, it does not lend itself readily to any continuous kind of manufacturing procedure.

It is a general object of the invention to obviate these and other disadvantages of current practice and to provide a method of making an improved article of manufacture adapted to be used more efficiently in providing a card-holding pocket in a library book. A device constructed in accordane with this invention involves a simple sheet of rectangular shape which bears a pressure-sensitive adhesive on its rear face, and a readily peelable covering overlying it. The sheet and covering are cut through to define an opening through which a library card can pass, and the covering alone is specially cut in such a way that when it is peeled off to expose adhesive a predetermined area remains in place to serve as part of the front wall of the pocket when the sheet is applied to a book surface.

In the preferred embodiment of the invention the front sheet has a turned-in edge along the bottom of the card pocket, and the rear face of the sheet is bare of adhesive in the region within the confines of the fold.

Another objective of the invention is to provide an improved continuous manufacturing procedure by means of which pocket-forming devices of the character referred to can be produced rapidly, efficiently, in large quantities and at relatively low cost.

Another object is to provide a method of manufacturing a device of the foregoing character, which simplifies library procedures to a further extent insofar as it permits a single preparatory operation to provide not only an imprinted card-holding pocket but also a correlated label for independent use on the spine of the book or elsewhere. This objective is achieved by providing a special cut through the front sheet alone, shaped and arranged to allow an area to be completely separated when the protective covering is peeled away.

A still further object of the invention is to provide a method of producing a pocket-forming device embodying a card-receiving opening of improved reinforced character.

Several ways of achieving these objects and advantages, and other advantages hereinafter to be pointed out, are illustrated in the accompanying drawings, in which—

FIG. 1 is a perspective view of a book provided on the inside of its rear cover with a card-holding pocket of the improved kind;

FIG. 2 is a view from the rear of a device suitable for use in forming a pocket such as that shown in FIG. 1, a part being cut away for the sake of compactness of illustration;

FIGS. 3 and 4 are greatly enlarged fragmentary cross-sections along the correspondingly numbered lines in FIG. 1, the dimensions being in some respects exaggerated for the sake of clearness;

Figure 5:
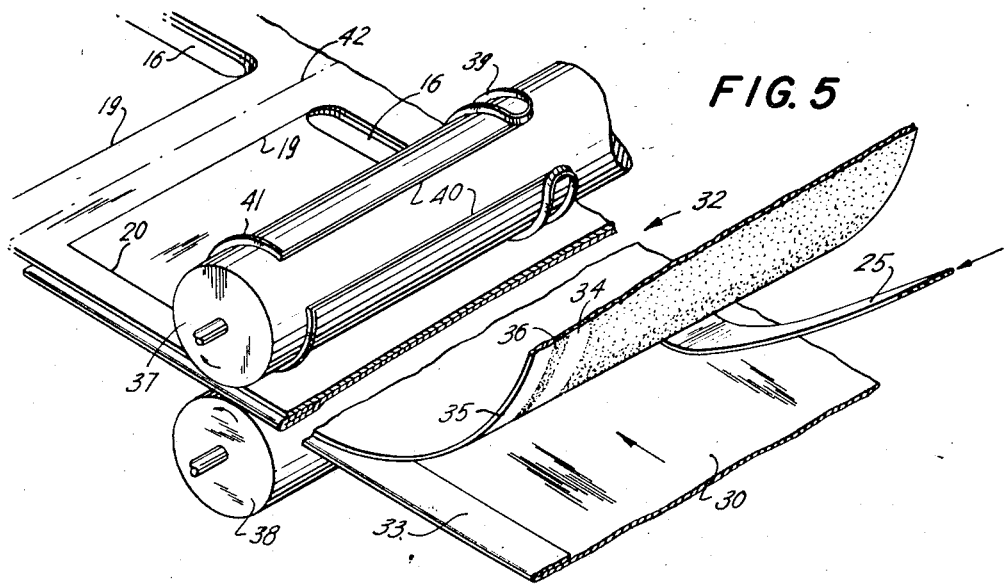
FIG. 5 is a schematic view of some of the apparatus and procedure that may be employed in a continuous manufacturing process.

For the librarian or other user to provide a card-holding pocket on a book surface, as shown in FIGURE 1, the device of FIGURE 2 is made available as an article of commerce. It consists of a substantially rectangular sheet of paper or paperboard 10 bearing pressure-sensitive adhesive 11 on its rear face and having a protective covering 12 of readily peelable material in overlying relation to it. Along one edge of the sheet 10 it is advantageously folded back along a fold line 13 to provide a marginal part which is turned in and lies beneath the corresponding marginal part of the covering 12. Within the confines of the folded-back region, i.e., at 14 (FIG. 3), the rear face of the sheet 10 is bare of adhesive. The outside of the turned-back part, however, bears a coating of adhesive as indicated at 15.

In a selected midportion of the article, at a distance from the folded-back edge 13 equal to the depth of pocket desired, there is an elongated cut-out or opening 16 extending substantially parallel to the edge 13. This opening is produced by a cut or cuts through both layers of the article, i.e., through the front sheet 10 as well as through the rear protective covering 12. The opening 16 is of a size adequate to permit passage through it of the desired library card 17 (see FIGS. 1 and 3).

Interposed between the sheets 10 and 12, in the medial region in which the cut 16 lies, is a reinforcement strip 25 preferably composed of a plastic such as "Mylar," or any other suitable material having maximum strength and minimum thickness. It is adhesively secured to the front sheet 10 and has a width slightly greater than that of the opening 16. It is preferably coated on its rear face with pressure-sensitive adhesive 18 (FIG. 4). The cut or cuts defining the opening 16 extend through the strip 25.

Formed in the covering sheet 12 alone are special cuts which enclose an area 22 having the dimensions of the desired pocket and lying directly alongside of the opening 16. The cuts include two (19) which are substantially perpendicular to the opening 16 and extend from the ends of the opening toward the edge 13, and a cut 20 connecting the ends of the cuts 19 and substantially aligned with the end edge of the turned-in margin of the front sheet 10.

Along a band or area 21 parallel to the edge 13 of the article and behind the lower margin of the area 22 there is an absence of adhesive as indicated in FIGS. 2 and 3.

The device as sold or furnished to the user is easily handled, and devoid of any exposed adhesive. It may be manufactured in various selected sizes. When the desired pocket is to be provided, the rear covering 12 is simply peeled off along all areas except the area 22, as indicated in FIGURE 2. This exposes pressure-sensitive adhesive along the area 15, along the lateral margins alongside of the area 22, and on the entire area on the upper side of the opening 16. The covering 12 is then discarded and the front sheet 10 adhesively applied to a book surface, such as the front or inner face 23 of the rear book cover 24, whereby the desired pocket comes immediately into being. Its rear wall is defined by the face 23 of the book cover 24 (FIGURE 3) and its front wall is defined by the unremoved area 22 of the covering sheet 12. The pocket is compact, simple in nature, and well able to withstand wear and tear. Its opening is effectively strengthened and reinforced by the "Mylar" or equivalent material surrounding it, and the absence of adhesive in the regions 14 and 21 facilitates the insertion and removal of the card 17 and guards against undesirable contact with adhesive.

The device described may be feasibly manufactured in an economical and efficient continuous process as indicated in FIG. 5.

Two continuous strips 30 and 31 are advanced longitudinally to a bonding station where they are joined in face-to-face relation with a pressure-sensitive adhesive between them. The bonding station is not indicated, but it is located in the region designated 32.

The sheets in question are a continuous strip of suitable paper or paperboard 30 adapted ultimately to serve as the front sheet of the pocket-forming device. This strip emanates from a suitable supply roll (not shown) and on its way to the region depicted in FIG. 5 one longitudinal edge is turned back as indicated at 33. It is this turned-back edge which will ultimately serve as the lower edge of the pocket-forming article.

The other strip 31 is composed of "release" paper or stock. It also emanates from a suitable supply roll (not shown), and during its travel from the point of supply to the region depicted in FIG. 5 it is coated on its inner face with a pressure-sensitive adhesive, as indicated by the stippling in FIG. 5. It will be noted that this stippling occurs across the entire width of the strip 31, except for an uncoated band 34 near the proximate edge, and another narrow uncoated band 35 directly along this edge. Between the bare stretches 34 and 35 there is a band or strip of adhesive designated 36. It is this band that will ultimately define the band of adhesive designated 15 in FIGS. 2, 3, and 4. The bare uncoated area 34 ultimately provides the bare strip 21 shown in FIGS. 2, 3 and 4.

The strip 31 has a width substantially equal to that of the strip 30 after the longitudinal edge has been turned back at 33.

Also fed to the bonding station is an intermediate relatively narrow strip of reinforcement material having maximum strength with minimum thickness, such as "Mylar," this being the strip 25 previously referred to. It is preferably coated with appropriate adhesive on it lower face (as shown in FIG. 5). This is the face which is directed toward the strip 30.

The strip 30 is composed of a material which is adhesophylic, i.e., it clings readily to the pressure-sensitive adhesive that is coated on the strip 31. The upper surface of the reinforcement strip 25 is also adapted to cling to such adhesive. As a result, when the layers are pressed together at the bonding station, they constitute a sandwich from which the material of the strip 31 can be readily peeled, leaving the adhesive on the corresponding regions of the strips 25 and 30.

The bonded strips are then subjected to a cutting treatment of special character, whereby successive areas are cut to provide openings 16 extending lengthwise, and cuts 19 and 20 which cut only through the strip 31 along lines surrounding a laterally disposed area directly alongside of each opening 16. To accomplish this result, a pair of rollers 37 and 38 may be provided, the roller 38 serving as a backing roller and the other being provided with appropriate cutters. One of these cutters is designated 39 and extends circumferentially around the roller 37, as shown, the peripheral length being substantially equal to the length of the desired opening 16 which is cut through all the layers of the superposed plies, viz, through the strip 31, through the reinforcement strip 25, and through the main strip 30. Cutters 40 are arranged in a parallel relationship, parallel to the axis of rotation of the roller 37, these cutters having a depth suitable to enable them to cut only through the strip 31, to form the cuts designated 19. A cutter 41 of circumferential character is provided to form the cuts designated 20.

At a subsequent point of travel an appropriate cutter is provided (not shown) which cuts transversely through the entire assembly in the regions (illustratively depicted by the dotted line 42) between the areas previously subjected to the action of the cutters 39, 40 and 41.

It is obvious from this description that the separated units severed from the continuously advancing assembly along successive transverse lines 42 are articles of the character depicted in FIG. 2. Thus, by a continuous manufacturing process, the articles can be produced rapidly and in large numbers, on a feasible and economical commercial scale.

Figure 6:
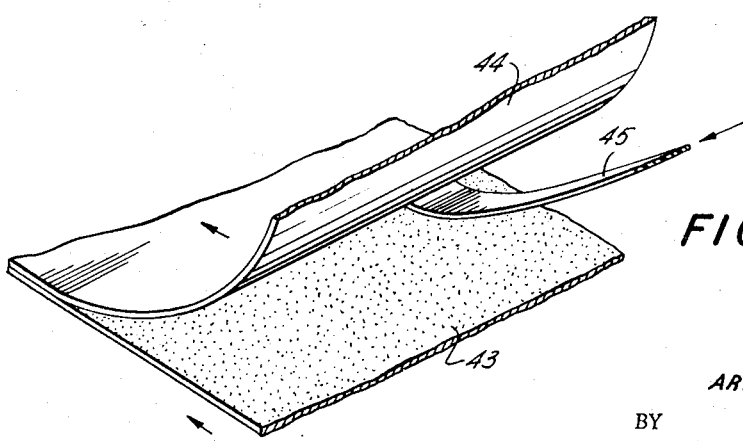
FIG. 6 is a similar view, illustrating a modification.

A modification of the procedure is depicted in FIG. 6, in which the continuous strip 43 (corresponding to the strip 30 of FIG. 5) is already coated upon its entire surface with pressure-sensitive adhesive, as indicated by the strippling. Coated strips of this kind are available on the market, and their employment, in the manner presently to be described, is therefore more economical than the use of specially coated strips such as that shown at 31 in FIG. 5.

The coated strip 43 travels from a supply roll (not shown) to a bonding station (not shown) and simultaneously a strip 44 of "release" material, and a narrower strip 45 of reinforcement material such as "Mylar" are also guided toward the bonding station. The strip 44 has a width substantially equal to that of the strip 43. At the bonding station these several layers are joined together and then they are subjected to the cutting treatments hereinbefore described. The separated articles that are produced when the treated assembly is cut transversely into successive pieces are pocket-forming devices such as that shown in FIG. 2, except that the front sheet does not have a turned-in edge and its inner face is coated throughout its entire extent with pressure-sensitive adhesive. Also, the reinforcement strip 45 does not bear any adhesive on the surface that is directed upward in FIG. 6.

When a device of this kind is used, the covering material is peeled off, as before, and when the adhesive-bearing sheet is applied to a flat book surface 46 (FIG. 7) the card-holding pocket 47 is formed, as before, between the surface 46 and the unremoved area 48 of the covering sheet. The front sheet 49 is adhesively joined, as at 50, to the book surface 46 around the entire periphery of the device. This type of pocket does not have the advantage of the pocket shown in FIG. 3, whereby the library card is guarded against contact with adhesive during its insertion and removal from the pocket. There is at least a possibility that the bottom edge of the card, when inserted into the pocket 47 of FIG. 7, may encounter some of the adhesive lying just beyond the lower edge of the area 48.

Figure 7:
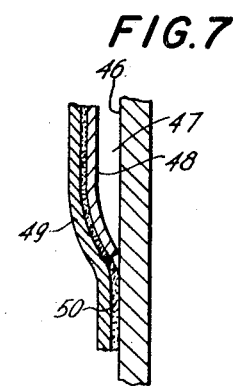
FIG. 7 is a view similar to FIG. 3 of a pocket formed of the modified device.

The device shown in FIG. 7 differs from that shown in FIG. 3 in the further respect that the upper edge of the opening 16 is not adhesively joined to the book surface 46, nor is the lower edge of the opening a completely bonded assembly, since the reinforcement strip 45 is not adhesively joined to the upper marginal part of the area 48.

A better adhesion along the edge of the pocket opening (in the device of FIG. 7) can obviously be achieved by omitting the reinforcement strip 45 entirely. The fact is that the corresponding reinforcement strip 25 can be omitted from the previously described (FIGS. 2–5) without materially altering the basic nature of the article.

Figure 8:
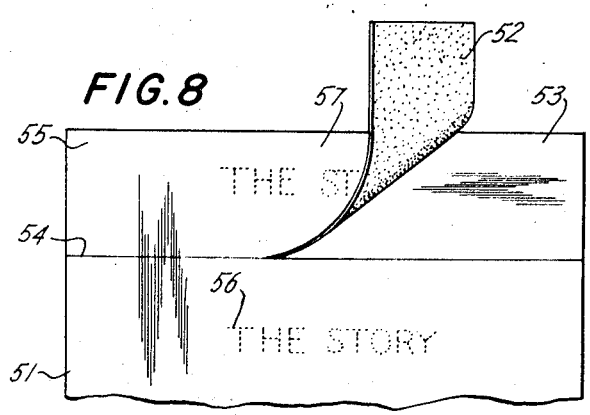
FIG. 8 is a front view of part of a device of the present kind, illustrating another modification.

In FIG. 8 a modification has been depicted which is applicable either to articles of the character shown in FIGS. 2–4, or to articles of the character shown in FIG. 7. The front or main sheet 51 bears pressure-sensitive adhesive 52 on its rear face, and this face is covered by a protective sheet 53 of readily peelable material. FIG. 8 shows merely the upper part of the pocket-forming device. It should be noted that a cut 54 has been formed in the front sheet 51 only. This cut has been shown as one which extends all the way from one lateral edge of the sheet 51 to the other. This is not essential. The purpose of the cut 54, whatever its shape, is to allow an area 55 to be completely separated when the covering 53 is peeled away, this separated area 55 bearing adhesive on its rear face and being independently adhesively applicable to another book surface, e.g., the spine of the book. The advantage achieved by this modified construction is that the pocket-forming device, prior to use, may be printed in a single operation on the exposed face of the main sheet 51, to place a desired designation 56 on the pocket-forming device and a similar or related designation 57 on the independently usable area 55. It has been the practice, heretofore, to provide card-holding pockets, and to provide separate labels or the like for application to the spine of the book. These accessories must be separately printed or typewritten, and this adds to the librarian's work. By means of the present arrangement, a single unit can be threaded into a typewriter, or into a printing mechanism, and in a single or almost-single operation, the related imprints 56 and 57 can be rapidly produced.

What is claimed is:

1. A method of making pocket forming devices for library cards, which consists in longitudinally advancing two continuous strips to a bonding station and there joining them in face-to-face relation with a pressure-sensitive adhesive between them, one of said strips being adhesophylic and the other being composed of release material, and then subjecting successive areas of the bonded assembly to
   (a) a cutting treatment which cuts through both strips to form an elongated longitudinal opening,
   (b) a cutting treatment which cuts only through the release material along lines completely surrounding a laterally disposed area directly alongside of said opening with said opening forming a part of the perimeter of said area, and
   (c) a cutting treatment which cuts transversely through both strips in the regions between said successive areas, thereby producing individual pocket forming devices.

2. A method as defined in claim 1, including the step of turning in a longitudinal edge of the first-named strip before it is bonded to the other, the strips being so guided that when bonded the turned-in edge of the first is overlain by the corresponding marginal part of the other.

3. A method as defined in claim 2, in which adhesive is omitted from said strip of release material along a longitudinal region substantially aligned with the turned-in edge of the first named strip.

4. A method as defined in claim 1, including the advancement to said bonding station of a continuous strip of reinforcement plastic, and the adhesive attachment thereof to the face of said adhesophylic strip facing the other strip in the region in which said elongated openings are to be formed.

References Cited

UNITED STATES PATENTS

| | | | |
|---|---|---|---|
| 2,097,916 | 11/1937 | Elmore | 229—74 XR |
| 2,304,787 | 12/1942 | Avery | 156—268 XR |
| 2,496,884 | 2/1950 | Miles | 156—268 XR |
| 2,611,369 | 9/1952 | Herrick | 229—71 XR |
| 3,250,385 | 5/1966 | Timms | 229—74 XR |
| 3,297,508 | 1/1967 | Jahp | 156—268 XR |

ROBERT F. BURNETT, *Primary Examiner.*

ROGER H. CRISS, *Assistant Examiner.*

U.S. Cl. X.R.

156—202, 253, 268, 269